(12) United States Patent
Ranmuthu

(10) Patent No.: US 6,724,551 B2
(45) Date of Patent: Apr. 20, 2004

(54) PREAMP FAST HEAD SWITCH TECHNIQUE FOR SERVO MODE

(75) Inventor: Indumini W. Ranmuthu, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 321 days.

(21) Appl. No.: 09/895,909

(22) Filed: Jun. 29, 2001

(65) Prior Publication Data

US 2003/0002185 A1 Jan. 2, 2003

(51) Int. Cl.[7] .................. G11B 27/36; G11B 15/12; G11B 5/03
(52) U.S. Cl. .................. 360/31; 360/61; 360/66
(58) Field of Search .................. 360/61, 66, 67, 360/46, 31, 60

(56) References Cited

U.S. PATENT DOCUMENTS

| | | | |
|---|---|---|---|
| 5,774,291 A | * | 6/1998 | Contreras et al. ............. 360/67 |
| 5,875,077 A | | 2/1999 | Uwabo et al. |
| 5,892,635 A | | 4/1999 | Morita |
| 6,018,437 A | | 1/2000 | Weichelt et al. |
| 6,118,611 A | * | 9/2000 | Shibasaki et al. ............. 360/67 |

* cited by examiner

*Primary Examiner*—David Hudspeth
*Assistant Examiner*—Glenda P. Rodriguez
(74) *Attorney, Agent, or Firm*—W. Daniel Swayze, Jr.; W. James Brady; Frederick J. Telecky, Jr.

(57) ABSTRACT

A differential circuit to read differential data from a disk by a current bias on a plurality of read heads includes a read circuit to read the differential data from the disk by maintaining the current bias. The current is below a maximum current of a read head having the lowest maximum voltage of said plurality of read heads.

6 Claims, 3 Drawing Sheets

PREAMP FAST HEAD SWITCH TECHNIQUE FOR SERVO MODE

FIELD OF THE INVENTION

The present invention related to disk drive storage systems and more particularly to a storage system that uses servo track writing.

BACKGROUND OF THE INVENTION

A typical disk drive storage system includes one or more magnetic disks which are mounted for co-rotation on a hub or spindle. A typical disk drive also includes a transducer supported by hydrodynamic bearing which files above each magnetic disk. The transducer and the hydraulic bearing are collectively referred to as a data head. A drive controller is used for controlling the disk drive based on commands received from a host system. The drive controller controls the disk drive to retrieve information from the magnetic disk and to store information on the magnetic disk. An electro mechananical actuator operates when a negative feedback, closed loop servo system moves the data head radically or linearly over the disk surface for track seek operation and holds the transducer directly above the desired track or cylinder on the disk surface for track following operations.

Information is typically stored in concentric tracks on the surface of the magnetic disk by providing a write signal to the data head to encode flux reversals on the surface of the magnetic disk representing data to be stored. In retrieving data from the disk, the drive controller controls the electro mechanical actuator so that the data head files above the desired track or cylinder on the magnetic disk, sensing the flux reversals on the magnetic disks and generating a read signal based on those flux reversals.

In an embedded servo system, servo information or servo bursts is recorded on data tracks, which also contain stored data. The servo bursts are typically temporally spaced evenly about the circumference of each data track. Data is recorded on a data track between the servo bursts. In a dedicated servo-type system, an entire disk surface and a disk drive is dedicated to storing the servo information.

As the data head reads the servo information, the transducer produces a position signal which is decoded by the position demodulator and presented in digital form to a servo control processor. The servo control processor essentially compares actual radial position of the transducer over the disk (as indicated by the embedded servo burst) with the desired position and commands the actuator to move in order to minimize position error.

The servo information is written on the disk surfaces during the manufacturer of the disk drive module. Each disk drive module is mounted to a servo writer support assembly which precisely locates the disk surface relative to the reference or origin. Each disk drive module is mounted to a servo writer support assembly which precisely locates the disk surfaces relative to reference or origin. The servo writer support assembly supports a position sensor, such as an laser light interferometer, which detects the position of the actuator relative to the disk surface. The position sensor is electronically inserted within the disk drive is negative feed back, close loop servo system for providing position information to the servo system while the servo data is being written to the disk surfaces. The servo writer support assembly may include a clock writer transducer which writes a clock pattern into the disk surface which is used for temporarily spacing the servo data about the circumference of each track.

However, to accomplish writing the servo data, the write heads must be switched very quickly. The servo writer may write one of many surfaces at one time. Additionally, the servo writer verifies by reading with read heads all the surface wedges have been in fact written. Thus, during this read operation, when it is determined that all the servo wedges or servo data has been written, it is necessary to switch very quickly between read heads. Additionally, the read head may be of differing head resistance. However, these read heads operate with differing maximum current or voltage levels and consequently it is necessary to adjust the voltage levels, to accommodate the differing head types to prevent the heads from being destroyed by voltage which exceed those maximum levels. As a consequence the time lost to change the voltage internally so that the heads are not destroyed greatly increases the head switching time.

SUMMARY OF THE INVENTION

The present invention includes a constant bias current circuit, which reads information from a head and minimizes the switching while in the servo mode. The circuit of the present invention operates the read heads at a safe operation current which is less than the smallest maximum current among all of the read heads employed. The present invention provides a switching less than 500 nanoseconds and at times can reach 300 nanoseconds for use in the servo mode.

DETAILED DESCRIPTION OF THE PRESENT INVENTION

The following invention is described with reference to figures in which similar or the same numbers represent the same or similar elements. While the invention is described in terms for achieving the invention's objectives, it can be appreciated by those skilled in the art that variations may be accomplished in view of these teachings without deviation from the spirit or scope of the invention.

Figure 3:
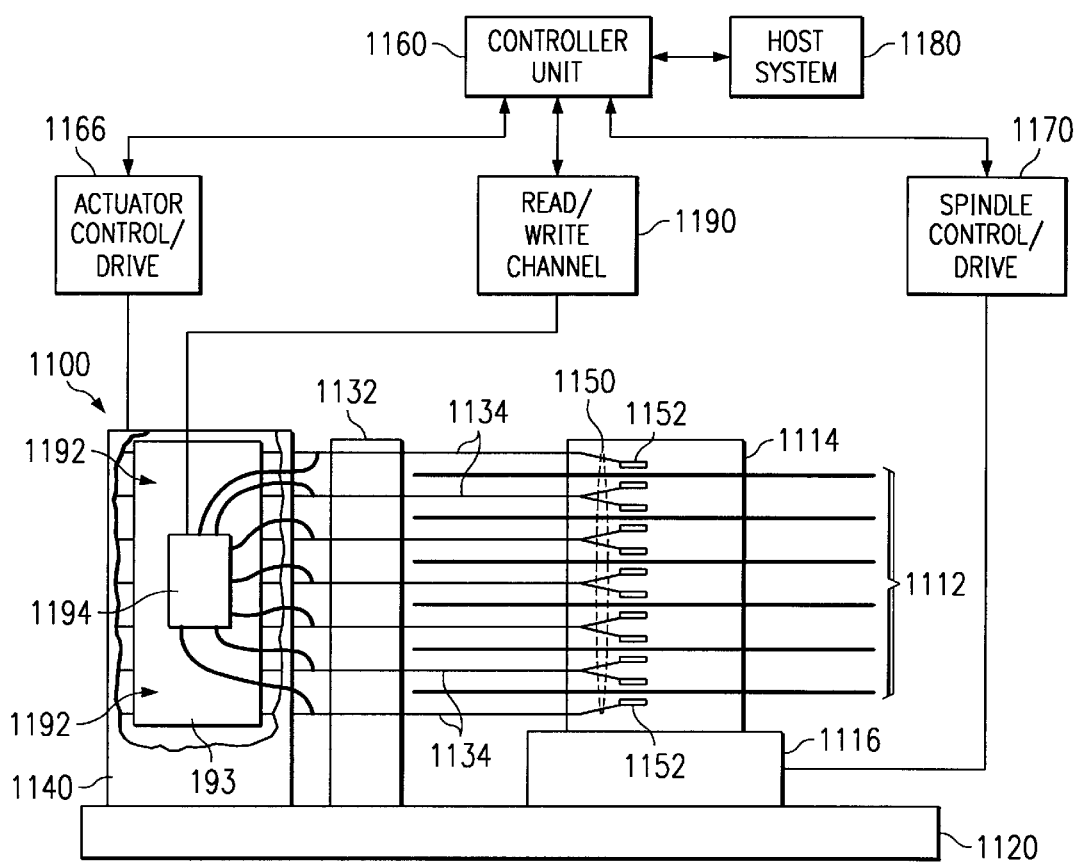
FIG. 3 illustrates a side-view of the disk drive system used with the present invention.
Figure 4:
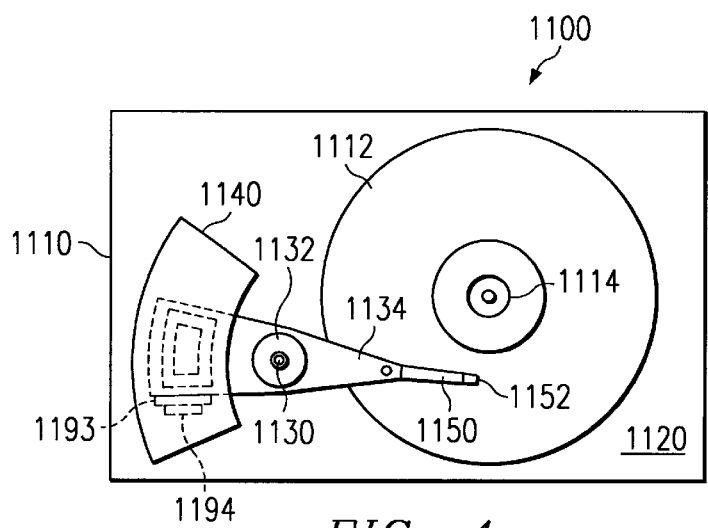
FIG. 4 illustrates the top-view of the disk drive system used with the present invention.

FIGS. 3 and 4 show a side and top view, respectively, of the disk drive system designated by the general reference 1100 within an enclosure 1110. The disk drive system 1100 includes a plurality of stacked magnetic recording disks 1112 mounted to a spindle 1114. The disks 1112 may be conventional particulate or thin film recording disk or, in other embodiments, they may be liquid-bearing disks. The spindle 1114 is attached to a spindle motor 1116, which rotates the spindle 1114 and disks 1112. A chassis 1120 is connected to the enclosure 1110, providing stable mechanical support for the disk drive system. The spindle motor 1116 and the actuator shaft 1130 are attached to the chassis 1120. A hub assembly 1132 rotates about the actuator shaft 1130 and supports a plurality of actuator arms 1134. The stack of actuator arms 1134 is sometimes referred to as a "comb." A rotary voice coil motor 1140 is attached to chassis 120 and to a rear portion of the actuator arms 1134.

A plurality of head suspension assemblies 1150 are attached to the actuator arms 1134. A plurality of inductive transducer heads 1152 are attached respectively to the suspension assemblies 1150, each head 1152 including at least one inductive write element. In addition thereto, each head 1152 may also include an inductive read element or a MR (magneto-resistive) read element. The read heads may differ maximum voltages for the levels. The heads 1152 are positioned proximate to the disks 1112 by the suspension assemblies 1150 so that during operation, the heads are in electromagnetic communication with the disks 1112. The rotary voice coil motor 1140 rotates the actuator arms 1134 about the actuator shaft 1130 in order to move the head suspension assemblies 1150 to the desired radial position on disks 1112.

A controller unit 1160 provides overall control to the disk drive system 1100, including rotation control of the disks 1112 and position control of the heads 1152. The controller unit 1160 typically includes (not shown) a central processing unit (CPU), a memory unit and other digital circuitry, although it should be apparent that these aspects could also be enabled as hardware logic by one skilled in the computer arts. Controller unit 1160 is connected to the actuator control/drive unit 1166, which is in turn connected to the rotary voice coil motor 1140. A host system 1180, typically a computer system or personal computer (PC), is connected to the controller unit 1160. The host system 1180 may send digital data to the controller unit 1160 to be stored on the disks, or it may request that digital data at a specified location be read from the disks 1112 and sent back to the host system 1180. A read/write channel 1190 is coupled to receive and condition read and write signals generated by the controller unit 1160 and communicate them to an arm electronics (AE) unit shown generally at 1192 through a cut-away portion of the voice coil motor 1140. The AE unit 1192 includes a printed circuit board 1193, or a flexible carrier, mounted on the actuator arms 1134 or in close proximity thereto, and an AE module 1194 mounted on the printed circuit board 1193 or carrier that comprises circuitry preferably implemented in an integrated circuit (IC) chip including read drivers, write drivers, and associated control circuitry. The AE module 1194 is coupled via connections in the printed circuit board to the read/write channel 1190 and also to each read head and each write head in the plurality of heads 1152. The AE module 1194 includes the constant voltage circuit 100 of the present invention.

Figure 1:
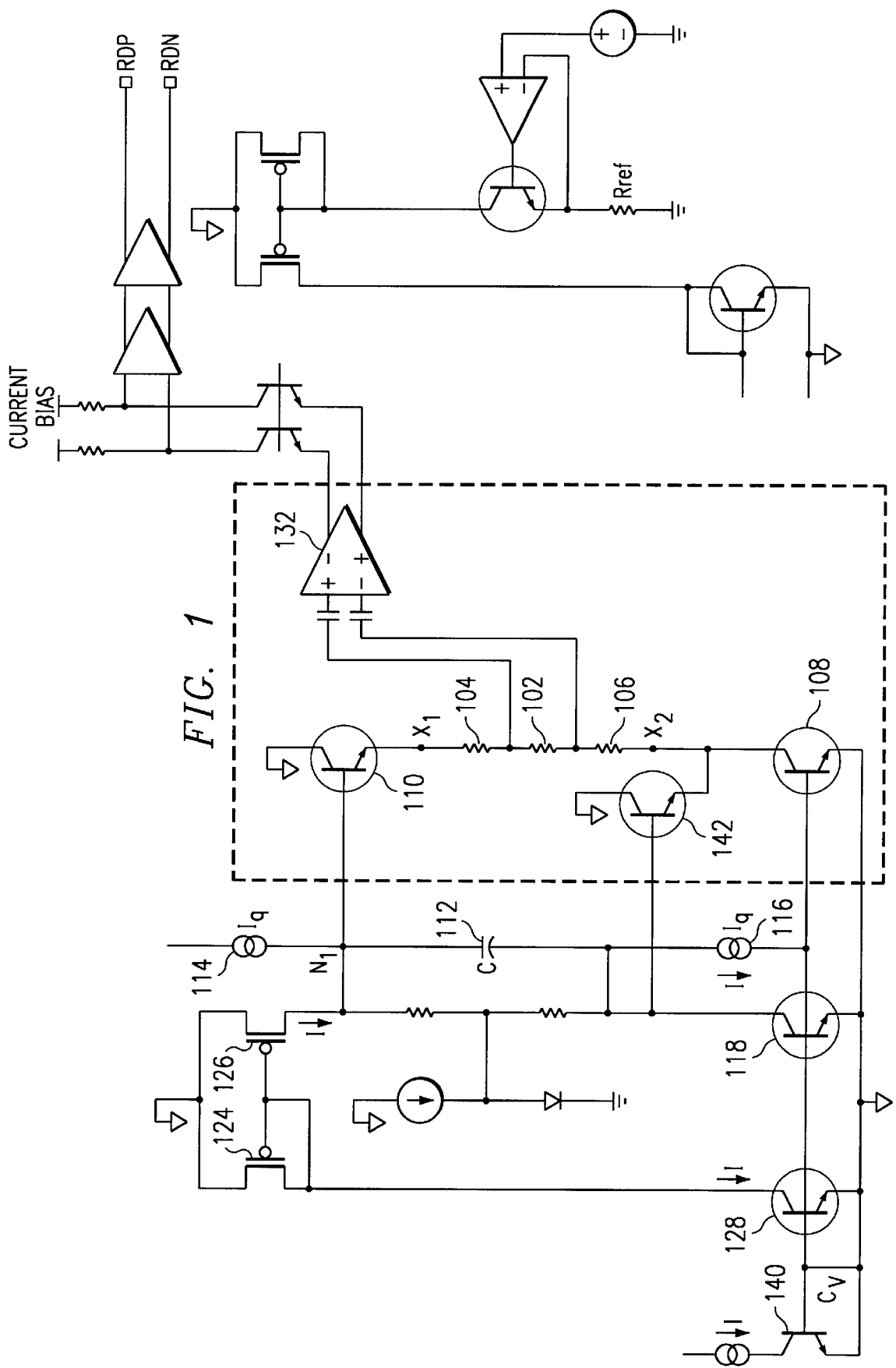
FIG. 1 illustrates a pre-amplifier using the constant current circuit of the present invention.
Figure 2A:
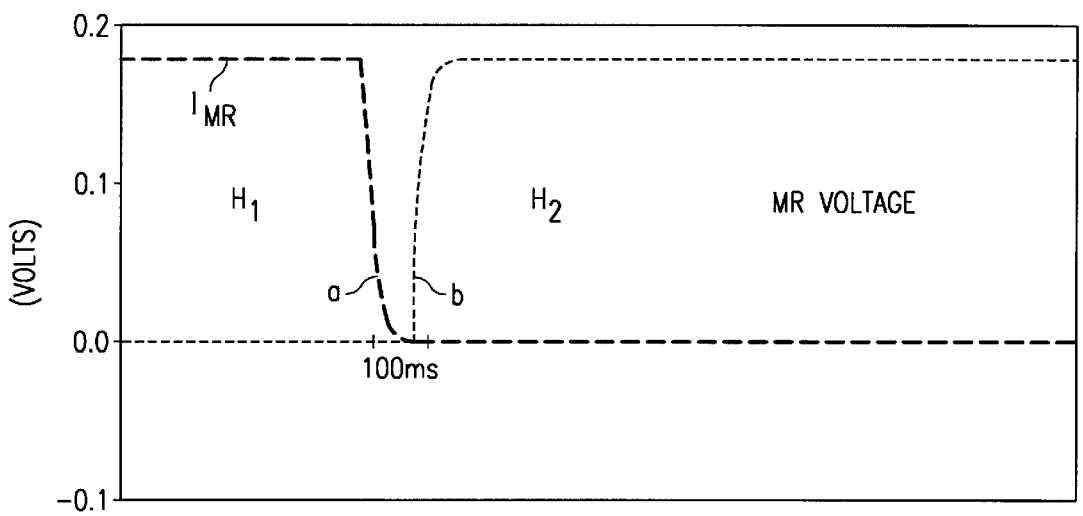
FIGS. 2a and 2b illustrate waveforms showing at least some of the improvements of the present invention.
Figure 2B:
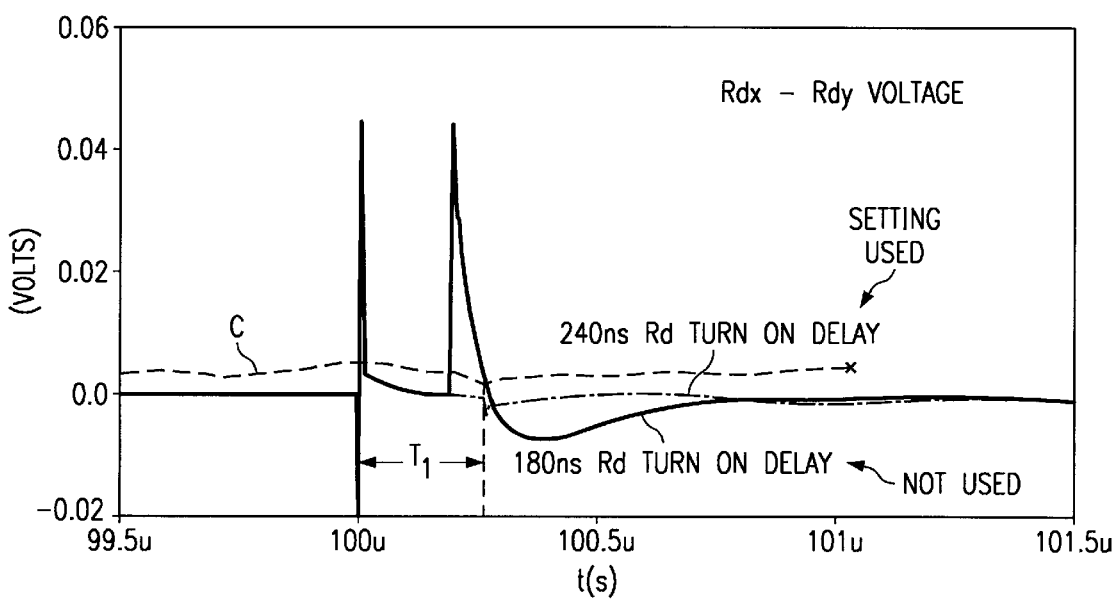

Turning now to FIG. 1, FIG. 1 illustrates six current paths of the constant voltage circuit 100.

The first current path conducts current $I_1$ through PFET 124 and NPN transistor 128. The source of PFET 124 is connected to voltage $V_{CC}$. The gate of PFET 124 is connected to the drain of PFET 124. Additionally, the drain of PFET 124 is connected to the collector of transistor 128. The base of transistor 128 is connected to capacitor 130 and to transconductance device 140. The emitter of transistor 128 is connected to, for example, a ground voltage. PFET 124 and PFET 126 form a current mirror, and transistor 128, transistor 140, transistor 118 and transistor 108 form an additional current mirror.

A second current path conducts current $I_2$ includes a current source 101 connected at one end to voltage $V_{CC}$ and the other end is connected to diode 102. The current source 101 and diode 102 are used to form a voltage between resistor 122 and resistor 120.

The third current path is used to conduct current $I_3$. Current $I_3$ is a current mirrored by the current mirror 124 and circuit represented by PFET 126. The magnitude of current $I_3$ is related to the magnitude of current $I_1$. The third current path includes PFET 126, resistor 122, resistor 120 and NPN transistor 118. The source of PFET 126 is connected to voltage $V_{CC}$. The drain of PFET 126 is connected to one end of resistor 122. The other end of resistor 122 is connected to current source 101 and to diode 102 and produced a voltage as a result of the current flow. The resistor 120 is connected to the other of resistor 122 and produces a voltage as a result of the current flow. The other end of resistor 120 is connected to NPN transistor 118. The collector of transistor 118 is connected to the other end of resistor 120. The emitter of transistor 118 is connected to ground, and the base of transistor 118 is connected to the base of transistor 128. The resistors 122 and 120 form a voltage based on the current $I_3$ times the resistance of resistor 122 and $I_3$ times the resistance of resistor 120. These voltages are used to form a voltage at terminals $N_1$ and $N_2$. The voltage at $N_1$ is the voltage at the emitter of transistor 110 minus $V_{BE}$. The voltage at the emitter of transistor 142 is the voltage at terminal $N_2$ minus $V_{BE}$. Likewise, the voltage at $N_2$ is the voltage across resistor at the base of transistor 142. The capacitor 112 is connected to one of resistor 122 and the other end of capacitor 112 is connected to the other end of transistor 120.

The fourth current path conducts current $I_4$. The fourth current path includes current source 114, capacitor 112 and current source 116. The current source 114 and the current source 116 allow the capacitor 112 to be quickly charged once the capacitor 112 has been discharged.

The fifth current path is to conduct the current $I_5$. The fifth current path includes transistor 108, transistor 110, resistor 102 which is the resistance associated with the MR head shown as head 1152, resistor 104 and resistor 106. The base of transistor 110 is connected to terminal $N_1$ and the collector of transistor 110 is connected to voltage $V_{CC}$. The emitter of transistor 110 is connected to resistor 104. The other end of resistor 104 is connected to resistor 102. The resistor 102 is an indication of the MR head. The other end of resistor 102 or the MR head is connected to transistor 106. The other end of resistor 106 is connected to the emitter of transistor 142. The collector of transistor 142 is connected to voltage $V_{CC}$. The other end of resistor 106 is connected to the collector of transistor 108. The base of transistor 108 is connected to the base of transistor 118, and the emitter of transistor 108 is connected to ground. The resistor 104 and resistor 106 provide a constant current to MR head shown as resistor 102. As discussed before, the voltage at terminal $N_1$ minus $V_{BE}$ is the voltage at the emitter of transistor 111, and the voltage at terminal $N_2$ is minus $V_{BE}$ is the voltage at the other end of resistor 106. The current through the MR head is the current through the resistors 104 and 106. This is equal to voltage across $X_1$ and $X_2/R_{104}+R_{106}+R_{102}$.

The plus input of differential amplifier 132 is connected to capacitor 131. The other end of capacitor 131 is connected through capacitor 131 to the terminal between resistor 104 and resistor 102 shown as MR head. The capacitor 133 has one end connected to the other end of resistor 102 and one end of resistor 106. The other end of capacitor 133 is connected to the negative input of differential amplifier 132.

In the prior art, capacitor 112 has to be discharged to zero volts in order to reduce the current across MR head illustrated by resistance 102 to zero when switching between read heads to prevent the maximum current from being exceeded. This takes a long time.

In contrast, the present invention, the voltage across capacitor 112 is kept to a sufficiently low level such as a safe current or a safe level of currents that are below the read head current of the read head with the lowest maximum head current. The voltage on capacitor 112 or capacitors 112 is determined to be a voltage level such that it is sufficiently low, not to cause over current stress on MR head illustrated by resistor 102. This is a safe voltage. This current is set by the current I2 through the second current path I2 and the current I2 is controlled by the current IDAC. The safe current is usable for servo mode, since each head does not have to operate at the maximum current. The head switch time is determined by the time the bias current of head ramp up, plus the time for the reader head output to settle to a steady state value with 10 milli-volts of base time. As a consequence of the present invention, it is not necessary to reduce the voltage across capacitor 112 to zero and the current will not change. This eliminates the charging time for this capacitor. The present invention maintains capacitor 112 at a safe voltage or a safe level of voltages which will vary depending on the type of heads used. It is thus possible to switch the head very quickly in the servo mode. There is not requirement to operate the read head at full current or voltage.

FIG. 3a illustrates the head current while FIG. 3b illustrates the voltage of the head. The curve $I_{MR}$ more particularly the curve to the left of point a on curve $I_{MR}$ illustrates when the first read head is switched on (to the right of position a). The first head is switched off to the left of position b. The second head is switched off and to the right of position b; position b is when the second head is switched on.

FIG. 3b shows with the present invention there is only a 240 ns delay. There is no line lost in charging up capacitor 112.

What is claimed is:

1. A differential circuit to read differential data from a disk by a current bias on a plurality of read heads, comprising:
   a read circuit to read said differential data from said disk by maintaining said current bias on said read head by maintaining a single safe current in each of said plurality of heads; and
   wherein said safe current is below a maximum current of all said plurality of read heads.

2. A differential circuit, as in claim 1, wherein said safe voltage is maintained across a capacitor of said read circuit.

3. A differential circuit to read differential data from a disk by a current bias on a plurality of read heads, comprising:
   a read circuit to read said differential data from said disk by maintaining said current bias on said read head by maintaining a safe current; and
   wherein said safe current is below a maximum current of all said plurality of read heads,
   wherein a head switching time of said read circuit is a less than 500 ns.

4. A disk system to read information from a disk, comprising:
   a read/write head to read and write information from said disk;
   a read channel to process said information; and
   a differential circuit to read differential data from a disk by a current bias on a plurality of read heads during servo write module, comprising:
      a read circuit to read said differential data from said disk by maintaining said current bias on said read head by maintaining a single safe current in each of said plurality of heads; and
      wherein said safe current is below a maximum current of all said plurality of read heads in frequency.

5. A disk system as in claim 4, wherein said safe voltage is maintained across a capacitor of said read circuit.

6. A disk system to read information from a disk, comprising:
   a read/write head to read and write information from said disk;
   a read channel to process said information; and
   a differential circuit to read differential data from a disk by a current bias on a plurality of read heads during servo write module, comprising:
      a read circuit to read said differential data from said disk by maintaining said current bias on said read head by maintaining a safe current; and
      wherein said safe current is below a maximum current of all said plurality of read heads in frequency
   wherein said a switching time of said read circuit is a less than 500 ns.

* * * * *